US009380326B1

(12) United States Patent
Corley et al.

(10) Patent No.: US 9,380,326 B1
(45) Date of Patent: Jun. 28, 2016

(54) SYSTEMS AND METHODS FOR MEDIA PROCESSING

(75) Inventors: Jonathan B. Corley, Seattle, WA (US); Tal Saraf, Seattle, WA (US); Bradley E. Marshall, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 433 days.

(21) Appl. No.: 13/465,992

(22) Filed: May 7, 2012

(51) Int. Cl.
G06F 15/16 (2006.01)
H04N 7/16 (2011.01)
H04N 21/2343 (2011.01)
H04L 29/06 (2006.01)

(52) U.S. Cl.
CPC .. *H04N 21/234309* (2013.01); *H04L 29/06482* (2013.01); *H04N 21/2343* (2013.01)

(58) Field of Classification Search
CPC ................ H04N 7/01; H04N 7/26941; H04N 19/00472; H04N 21/2343–21/234309; H04L 29/06482–29/06503
USPC .......................... 709/203.217–219, 246–247; 386/326–342
See application file for complete search history.

(56) References Cited

U.S. PATENT DOCUMENTS

| 5,541,852 | A | | 7/1996 | Eyuboglu et al. |
| 6,732,332 | B1 * | | 5/2004 | Borysewicz et al. ......... 715/240 |
| 6,970,602 | B1 | | 11/2005 | Smith et al. |
| 7,231,023 | B1 | | 6/2007 | Begeja et al. |
| 7,761,900 | B2 | | 7/2010 | Crayford |
| 7,958,532 | B2 | | 6/2011 | Paul et al. |
| 8,634,705 | B2 * | | 1/2014 | Yogeshwar et al. .......... 386/326 |
| 9,078,091 | B2 | | 7/2015 | Lehtiniemi et al. |
| 9,088,634 | B1 | | 7/2015 | Corley |
| 9,183,049 | B1 * | | 11/2015 | Corley .................. G06F 9/4881 |
| 9,189,484 | B1 * | | 11/2015 | Velummylum ... G06F 17/30067 |
| 9,223,621 | B1 * | | 12/2015 | Corley .................. G06F 9/5005 |
| 2002/0150247 | A1 | | 10/2002 | Linnartz et al. |
| 2002/0170035 | A1 | | 11/2002 | Casati et al. |
| 2006/0168630 | A1 | | 7/2006 | Davies |
| 2007/0002946 | A1 | | 1/2007 | Bouton et al. |
| 2007/0106622 | A1 | | 5/2007 | Boomershine |
| 2007/0157260 | A1 | | 7/2007 | Walker |
| 2007/0162945 | A1 | | 7/2007 | Mills |
| 2007/0174338 | A1 | | 7/2007 | Liggett |
| 2008/0034393 | A1 | | 2/2008 | Crayford |

(Continued)

OTHER PUBLICATIONS

"API". Newton's Telecom Dictionary, 18th ed., Feb. 2002.*

(Continued)

*Primary Examiner* — Brendan Higa
(74) *Attorney, Agent, or Firm* — Hogan Lovells US LLP

(57) ABSTRACT

A processing service provides content publishers and other such users with automated content processing (e.g., transcoding or other). The content publisher is enabled to provide content (e.g., media files) to an input location for applying various processing to the content. Upon determining that the content has been placed into the input store, the processing service may select an appropriate workflow to be applied to the content and execute the workflow. The workflow may be selected based on various attributes of the content, the publisher, or the input store, such as the file name, embedded metadata, file size, time of day and the like. The workflow can process the content and store the resulting content into an output store or provide the content to various viewer devices. The workflow may also be customizable by the content publisher via an API or other such interface.

24 Claims, 7 Drawing Sheets

(56) References Cited

U.S. PATENT DOCUMENTS

| | | | |
|---|---|---|---|
| 2008/0146160 | A1 | 6/2008 | Jiang et al. |
| 2008/0205510 | A1 | 8/2008 | Komi et al. |
| 2008/0301588 | A1 | 12/2008 | Kumar et al. |
| 2009/0083279 | A1 | 3/2009 | Hasek |
| 2009/0254672 | A1* | 10/2009 | Zhang ..................... 709/231 |
| 2009/0276266 | A1 | 11/2009 | Nishiyama |
| 2009/0276716 | A1 | 11/2009 | Chua |
| 2010/0017516 | A1 | 1/2010 | Sparrell et al. |
| 2010/0054148 | A1* | 3/2010 | Murakami et al. ............ 370/252 |
| 2010/0054327 | A1 | 3/2010 | Capless |
| 2010/0076805 | A1 | 3/2010 | Batsakis et al. |
| 2010/0088505 | A1 | 4/2010 | Coppola et al. |
| 2010/0131674 | A1 | 5/2010 | Vecchio et al. |
| 2010/0195540 | A1 | 8/2010 | Kerr et al. |
| 2010/0199299 | A1 | 8/2010 | Chang et al. |
| 2010/0205616 | A1 | 8/2010 | Lai et al. |
| 2010/0250710 | A1 | 9/2010 | Cadwell et al. |
| 2010/0281042 | A1 | 11/2010 | Windes et al. |
| 2010/0309794 | A1 | 12/2010 | Keynan et al. |
| 2010/0332262 | A1 | 12/2010 | Horvitz et al. |
| 2011/0019870 | A1 | 1/2011 | Ballocca et al. |
| 2011/0082982 | A1 | 4/2011 | Harvell et al. |
| 2011/0088076 | A1 | 4/2011 | Li et al. |
| 2011/0153628 | A1 | 6/2011 | Basu et al. |
| 2011/0197221 | A1 | 8/2011 | Rouse et al. |
| 2011/0209162 | A1 | 8/2011 | Machiraju et al. |
| 2011/0313982 | A1* | 12/2011 | Kranendonk et al. ........ 707/702 |
| 2011/0314093 | A1 | 12/2011 | Sheu et al. |
| 2012/0072542 | A1 | 3/2012 | McGowan |
| 2012/0089687 | A1* | 4/2012 | Katz ............................ 709/206 |
| 2012/0102154 | A1 | 4/2012 | Huang et al. |
| 2012/0158645 | A1 | 6/2012 | Shafiee et al. |
| 2012/0159494 | A1 | 6/2012 | Shafiee et al. |
| 2012/0159503 | A1 | 6/2012 | Shafiee et al. |
| 2012/0192239 | A1 | 7/2012 | Harwell et al. |
| 2012/0209942 | A1 | 8/2012 | Zehavi et al. |
| 2012/0236201 | A1 | 9/2012 | Larsen et al. |
| 2012/0254456 | A1 | 10/2012 | Visharam et al. |
| 2012/0265847 | A1 | 10/2012 | Swenson et al. |
| 2012/0278441 | A1 | 11/2012 | Li et al. |
| 2013/0019311 | A1 | 1/2013 | Swildens |
| 2013/0054827 | A1 | 2/2013 | Feher et al. |

OTHER PUBLICATIONS

"Software." The Authoritative Dictioanry of IEEE Standard Terms. 7th ed. 2000, pp. 1067.*

Non-Final Office Action issued in U.S. Appl. No. 13/465,944 dated Sep. 24, 2014, 23 pages.

Final Office Action issued in U.S. Appl. No. 13/465,975 dated Sep. 11, 2014, 48 pages.

Non-Final Office Action issued in U.S. Appl. No. 13/465,975 dated Feb. 4, 2014, 32 pages.

Final Office Action issued in U.S. Appl. No. 13/465,978, dated Jul. 3, 2014, 26 pages.

Non-Final Office Action issued in U.S. Appl. No. 13/465,978 dated Feb. 4, 2014, 23 pages.

Non-Final Office Action issued in U.S. Appl. No. 13/465,987 dated Apr. 2, 2013, 9 pages.

Final Office Action issued in U.S. Appl. No. 13/465,987 dated Oct. 24, 2013, 10 pages.

Non-Final Office Action issued in U.S. Appl. No. 13/465,997 dated May 1, 2014, 12 pages.

Non-Final Office Action issued in U.S. Appl. No. 13/465,997 dated Oct. 21, 2014, 14 pages.

Non-Final Office Action issued in U.S. Appl. No. 13/466,002 dated Jan. 3, 2013, 11 pages.

Final Office Action issued in U.S. Appl. No. 13/466,002 dated Jul. 19, 2013, 12 pages.

Non-Final Office Action issued in U.S. Appl. No. 13/466,002 dated Sep. 23, 2014, 12 pages.

U.S. Appl. No. 61/562,377.

U.S. Appl. No. 61/527,485.

"Notice of Allowance dated Mar. 27, 2015", received in U.S. Appl. No. 13/465,931.

"Non Final Office Action dated Jul. 31, 2015", received in U.S. Appl. No. 13/465,944.

"Non Final Office Action dated Oct. 22, 2015", received in U.S. Appl. No. 13/465,960.

"Final Office Action dated Sep. 8, 2015", received in U.S. Appl. No. 13/465,975.

"Final Office Action dated Aug. 27, 2015", received in U.S. Appl. No. 13/465,978.

"Non Final Office Action dated Jul. 17, 2015", received in U.S. Appl. No. 13/465,987.

"Notice of Allowance dated Nov. 20, 2015", received in U.S. Appl. No. 14/682,004.

"Non Final Office Action Jun. 5, 2015", received in U.S. Appl. No. 14/682,004.

Non-Final Office Action issued in U.S. Appl. No. 13/465,975 dated Feb. 4, 2014.

Non-Final Office Action issued in U.S. Appl. No. 13/465,978 dated Feb. 4, 2014.

Non-Final Office Action issued in U.S. Appl. No. 13/465,987 dated Apr. 2, 2013.

Final Office Action issued in U.S. Appl. No. 13/465,987 dated Oct. 24, 2013.

Non-Final Office Action issued in U.S. Appl. No. 13/465,997 dated May 1, 2014.

Non-Final Office Action issued in U.S. Appl. No. 13/466,002 dated Jan. 3, 2013.

Final Office Action issued in U.S. Appl. No. 13/466,002 dated Jul. 19, 2013.

* cited by examiner

SYSTEMS AND METHODS FOR MEDIA PROCESSING

BACKGROUND

Digital media inherently demands large and sometimes unpredictable amounts of storage, compute, and delivery. Companies that utilize digital media spend large amounts of their time and resources managing, scaling, and maintaining media processing systems. Companies that leverage digital media are looking for encoding systems and services to provide the best video quality at a low cost. These media companies are facing new and increasing challenges as their needs for digitizing content for consumers expands and as alternative digitization options begin to supplant or augment old models.

Today, digital media is delivered to multiple device types over unmanaged networks with fluctuating bandwidth. As a result, transcoding approaches are needed that are able to produce versions of each asset to accommodate these variants, which is becoming increasingly difficult with the addition of new devices, codecs, and delivery mediums. These challenges, coupled with the lack of standardization across platforms, places ever increasing strain on existing capacity to process media.

BRIEF DESCRIPTION OF THE DRAWINGS

Various embodiments in accordance with the present disclosure will be described with reference to the drawings, in which.

DETAILED DESCRIPTION

Figure 1:
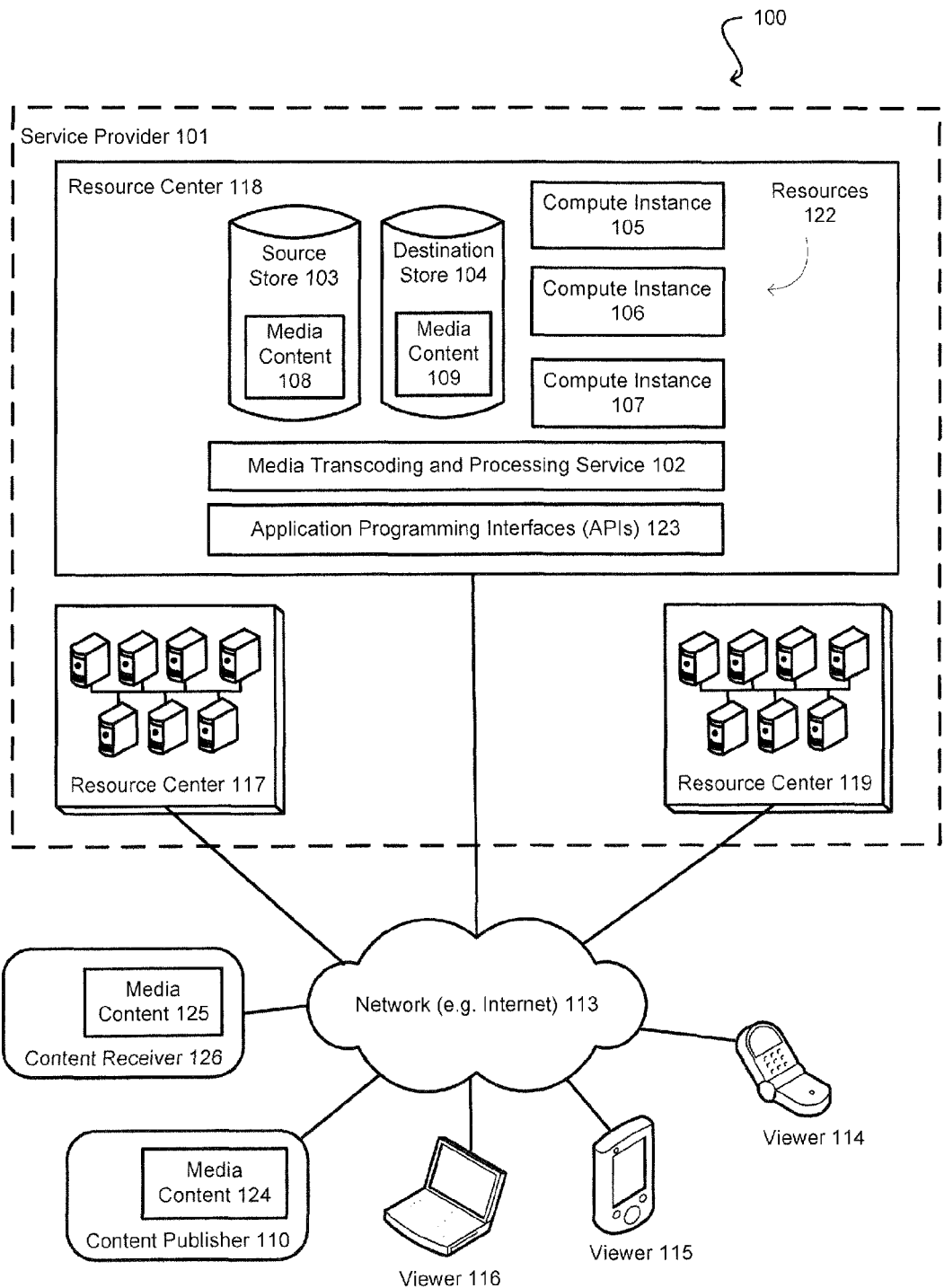
FIG. 1 is a general example of an environment in which the transcoding and other processing of media content can be implemented, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches to processing content in an electronic environment. In particular, embodiments enable content, such as various types of media files, to be dynamically processed for a multitude of different viewers and/or types of end user devices. Various embodiments provide at least one transcoding service that provides content publishers or other such entities with the ability, via a workflow system or other such mechanism, to transcode and/or perform various other such processes on different types of content.

In accordance with various embodiments described and suggested herein, a service provider system can enable a content publisher to subscribe to a transcoding and processing service through a network, such as the Internet. As used herein, a "content publisher" can refer to any person, device, system, service, or entity operable to provide digital content, such as media files (e.g., video, audio, image, e-book, and presentation, among others), for consumption by one or more other users in one or more formats. Consumption of the content can include purchasing, renting, leasing, downloading, streaming, viewing, or otherwise obtaining or accessing an instance or copy of the content. A content processing system in some embodiments can be implemented as a Web service, where publishers and/or other users or customers are able to make Web service calls into the system through one or more application programming interfaces (APIs).

A content processing system in some embodiments can provide a number of input data stores and a number of output data stores, although in some embodiments these may comprise different sections of the same or similar data stores, which may be distributed across multiple physical devices. Such a system can enable a content publisher to specify an input store, for example, as well as to provide (e.g. upload) media content in a particular format to the input store. In other embodiments, the system might assign an input store for the user content. The input store may be specified using a policy, configuration file, or other interface that may be accessed by the content publisher or other such users. In accordance with an embodiment, the system monitors the input store and detects whenever new or modified content appears in the input store. The detecting may be implemented by scanning the input store periodically, or by the system receiving a notification that the content has been uploaded, among other such options. Once the new content is detected in the respective input store, a processing service (such as a media transcoding service) can analyze information about the content, in order to select one (or more) of a set of predetermined workflows and apply the selected workflow to the media content. The workflow can cause one or more processes to be performed with respect to the content, and can dictate the order and selection in which various steps of each process are performed. In accordance with at least one embodiment, a selected workflow can include operations such as transcoding the media content from a format provided by the provider into one or more different formats, and storing the additional formats of the transcoded media into at least one specified output store, where the media formats can be made available for downloading, viewing, or other such access. The output store may have been specified by using a policy, configuration file, or other interface that may be accessed by the content publisher or other user, such as is discussed above with respect to the input store.

In some embodiments, provided content can be processed from the input store at specified scheduled times rather than acting on the file at a time shortly after the content is detected in the input store. For example, a content publisher that owns a cable television show could schedule a transcoding service to apply a particular workflow to a new episode of the show at a particular time of day or week. By way of illustration, if a new episode airs ending at 9:00 pm every week on Sunday, the workflow could be scheduled to initiate at 9:01 pm. Other reasons exist as well, such as the service providing a lower cost for transcoding or other processing at off-peak hours or on weekends. The workflow may then transcode the media file containing the newest episode into all of the desired formats, in order to be made available to viewers of the television show over a wide variety of media delivery mediums. In addition, the workflow may apply a variety of other functions to the media content.

In various embodiments, workflows can include different types of processing to generate additional or alternative formats or versions of an instance of content. For example, a workflow can include functions such as transmuxing the content, transrating the content to have a different bitrate, transsizing the content to a different resolution, encoding the content media for storage or transmission, re-encoding the content, or compressing the content to save storage space. Examples for specific types of content include changing the audio track of a video file, adding subtitles or translating media into a different language, adding advertising or other personalized content to a media presentation, watermarking or adding security information to media, segmenting media content, adding meta data relating to an aspect of the content, or performing any other function that modifies the content in some way. Each workflow may include any combination of at least one of these or various other functions. In certain embodiments, the workflow may also include a plurality of workflows. Some examples of the various media formats may include but are not limited to H.264/MPEG-4 AVC, M-JPEG, MPEG-4, OGG-Theora, VP8-WebM, VC1 (SMPTE), as well as any other media formats and encodings that are known in the art.

In various embodiments, the workflows can be predefined and automatically applied to the content. In one embodiment, the particular workflow that is to be applied to the content may be selected based on the specific input store into which the content was placed. Alternatively, the workflow may be specified using a regular expression based on the name of the content file, or by some other means. For example, given a file name "ABC123ASDF.wav", different parts of the filename can be parsed to determine the selected workflow. In one embodiment, the workflow can be combination of different workflows that are based on different portions of the filename. For example, the first workflow may transcode the media content into several encoding formats, another workflow may add a watermark to the media content and the final workflow may deliver the transcoded and watermarked content to a third party. In various alternative embodiments, the workflow may also be selected based on metadata embedded into the media content, file size, file type, time of day, the user that has submitted the media content, a separate file (e.g. configuration file) and the like.

In one example, a workflow may include transcoding a weekly television from a download-capable format into multiple formats optimized for video-on-demand consumption by many different devices having different bandwidth capabilities. The workflow could then define that subtitles should be added to each and an access control scheme, such as DRM, be applied. Another workflow could include transcoding a news broadcast into various formats for web browsers, tablet computers and smartphones, and add advertisements thereto. There could also be multiple workflows invoked for one piece of media content. For example, a first workflow could transcode the media file into various media formats, and a second workflow could perform ad insertion, adding subtitles and applying access controls.

In accordance with various embodiments, a content publisher may define its own custom transcoding parameters or leverage a set of predefined common device profiles provided by the service provider. The transcoding service can allow the content publisher to provide content to a storage location by uploading the content, or alternatively request that the content be pulled by the service provider. The content publisher may also be enabled to define a workflow using the various APIs or other interface exposed by the service provider, store the resulting encoded assets, and deliver the assets to viewers. In addition, various embodiments provide approaches for inserting advertising and other content into various media file(s). It should be understood that although media content is used in various examples, the types of content processed can include any appropriate content, such as is discussed and suggested elsewhere herein.

In one embodiment, there can be a plurality of stores (e.g. storage locations) associated with a plurality of predefined profiles, such that a content publisher can upload media to a specific input store to have a profile associated with that location applied thereto. Alternatively, the service provider could pull or retrieve content from a location as directed by the content publisher. The service provider could also pull content on a recurring basis such as on a weekly schedule, for example. In another embodiment, whenever content is placed in a location decided upon in advance by the content publisher and the service provider, the service provider could run a predetermined workflow for applying profiles, such that whenever something is placed in the input store, the service provider automatically knows the content publisher's needs, executes accordingly, and applies the profiles.

FIG. 1 is a general example of an environment 100 in which the transcoding and other processing of media content can be implemented, in accordance with various embodiments.

As illustrated, a service provider environment 101 can include a variety of devices and components for receiving and processing requests from various users across one or more networks 113. As discussed, access to these resources can be provided as one or more services, such as Web services. In this example, the service provider environment includes a plurality of resources 122, such as data storage resources and request processing resources, that can be deployed in one or more resource centers (117, 118, 119) in one or more locations and made accessible over the one or more networks 113. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with various embodiments, resource centers of the service provider 101 may include various computer servers, data storage machines, network devices and other hardware resources necessary to provide the network-accessible services on behalf of the clients of the service provider. For example, as shown in FIG. 1, the resource centers can include physical servers and other devices located in a particular geographical location, which enable the service provider to transcode, process and/or deliver media content to viewer devices (114, 115, 116). In accordance with an embodiment, a resource center can include media cache servers, transcoding servers, watermarking servers and the like. The view of one of the resource centers 118 is shown in an exploded view to provide further illustration of the types of resources 122 that can be contained in a resource center in accordance with various embodiments. It should be noted that the resources 122 can reside in one resource center or can alternatively be distributed across multiple resource centers.

In accordance with various embodiments, the service provider 101 offers a media transcoding and processing service 102 in addition to many other services discussed herein. In one embodiment, the media transcoding and processing service 102 can perform the transcoding jobs of media content 108, 109 stored in data stores (e.g. source store 103, destination store 104) of the service provider 101. In alternative embodiments, the media transcoding and processing service 102 may perform various other functions, such as transmuxing the media, adding security information (e.g. watermarks) to the media, translating the media or adding subtitles and the like.

In accordance with an embodiment, components of the service provider environment 101 enable a content publisher 110 to provide (e.g. upload) a media file to a source store 103 and to schedule the transcoding jobs to be performed thereon. In various embodiments, the source store 103 may be located on the resource center of the service provider or on a remote system, such as the system of the content publisher 110. As an example, the content publisher 110 can upload content 124, such as a media file, to a source store 103 and specify that a set of selected workflows should be applied to the media file. A workflow can apply a particular profile(s) to the media content. In accordance with an embodiment, a profile contains all the information (e.g. settings, parameters, etc.) that may be necessary to transcode the media content into the specific encoding format for a particular device, operating system, or application. For example, one or more profiles can be provided to transcode certain types of media content into formats suitable for iPhone® IOS, Android®, Microsoft Windows Phone® and other mobile device operating systems. The media transcoding and processing service 102 then carries out the workflow, including potentially transcoding the media content stored on a source store 103 into the appropriate encodings. Once workflow is complete, the resulting media content can be placed into a destination store 104. The destination store may be located on the resource center of the service provider or a remote system, such as the system of the content publisher 110 or other entity, such as the content receiver 126. As such, in this example, the media content located in the destination source has had the workflow applied. From the destination store 104, the media content can be made available to a content receiver 126 or the various viewer devices (114, 115, 116) for download. In alternative embodiments, the processed content could be made available to any other entities, including the content publisher 110 or third party service providers.

It should be noted that the term "transcoding" is often associated with a profile or a workflow in this disclosure; however, the profiles, workflows, and various other features of this disclosure are not limited to changing the encoding format of media and, in some embodiments, may not include changing the encoding format at all. For example, a profile or workflow, may include transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. By way of illustration, one workflow could include segmenting a video file for multi-bitrate support and adding audio to the video file and another workflow could include digital watermarking and applying access controls to the file. In accordance with the present disclosure, transcoding may often be a part of various workflows, but is not a required part of every workflow discussed herein.

In accordance with an embodiment, the transcoding service can execute the transcoding jobs using the compute instances (105, 106, 107) of the service provider. In one embodiment, each compute instance is a virtual server resource or virtual node having a specific processing capacity and memory associated therewith, which allows the service provider to meter the usage of the transcoding service by each client (e.g. the service provider may charge per hour of computing resource consumed). In an alternative embodiment, the compute instances can be actual server machines in the data center 100 maintained by the service provider 101 and leased to its customers (e.g. content publisher 110).

It should be noted that while FIG. 1 illustrates a source store 103 and a destination store 104 located in resource center 118, the locations of such stores are not limited to any particular resource center, server or physical computing device. It will be evident to one of ordinary skill in the art that various stores, storage containers, servers, compute instances, transcoding services and other resources described herein can be located in any resource center or distributed across multiple resource centers or geographical locations, allowing data or content to be replicated across all or some of the devices therein. For example, the resource center 117 could be in Europe, the resource center 118 could be Asia, and the resource center 119 could be in the United States. In various embodiments, the various storage containers, servers, compute instances, transcoding services and other resources described herein could also reside on a single device.

In accordance with various embodiments, the transcoding service 102 can provide content publishers with an automated transcoding and workflow system that is reliable and scalable. The content publishers may define the transcoding parameters on their own or leverage a set of predefined common device profiles that are provided by the service provider. The transcoding service can allow the content publishers to upload content to the storage instance, define a workflow, store the resulting encoded assets on the service provider's system, and deliver their media assets to viewers or others, for example, via a content delivery network (CDN) of the service provider. In other examples, the media assets are made available or delivered to third parties for distributing the media assets or for providing additional services.

Generally, a content publisher (e.g. customer of the service provider) can register for an account by signing up, for example, with the service provider 101 to gain access to media transcoding and processing service. Once an account is created, media assets 108, 109, 124 (e.g. video files) to be transcoded are placed into an input store on the service provider. A workflow can be defined using an application programming interface (API) 123 or console, for example, to initiate a transcoding job which will be carried out using one or more of the compute instances (105, 106, 107). The resulting transcoded object(s) are placed into a defined output store 104 or some other specified location, such as a location on the system of the content publisher 110 or the content receiver 126. Alternatively, the transcoding service can cache the media assets at the network edge and perform the transcoding dynamically on a per-request basis depending on the type of requesting device.

In various embodiments, the media transcoding and processing service 102 can accept media content in a wide variety of incoming formats and can convert the content into a comprehensive collection of output encodings. For example, the transcoding service can transcode to the media to formats suitable for common devices such as Android® and Apple@IOS based devices, Flash®, and HTML5 platforms by providing a set of pre-defined device profiles. The pre-defined profiles can be leveraged by the content publisher when setting up a job via the API 123 or via the graphical console. These profiles can be used as is or modified into a custom profile to be reusable for subsequent transcoding job requests.

The content publisher 110 may be any content creator, content distributor, user generated content publisher, or any other entity that possess media content and desires to make that content available to viewers or other entities. Examples of content creators may be motion picture studios, universities producing educational content, private organizations producing internal video content, and other organizations such as online real estate and auto sales companies producing videos to increase sales. Content distributors may be cable and television service providers, music distributors, movie purveyors and the like. Examples of user generated content publishers may be social media companies, video uploading services, and any other entity that stores content on behalf of its viewers. The content receiver 126 can be any entity that is provided with content 125 that has been transcoded or otherwise processed by the transcoding service. For example, the content receiver 126 may be a third party movie distributor that wishes to provide the transcoded video content on its own website.

In accordance with an embodiment, the service provider 101 can provide a content repository for all types of media files for transcoding and encoding. By focusing on the particular requirements of content publishers (e.g. multiple input types, scale to handle spikes, and a vast range of delivery targets) the transcoding service can provide a solution that can help any type of customer or entity of the service provider.

In accordance with various embodiments, the service provider 101 may implement a number of pricing models for using the transcoding service. As one option, the pricing of transcoding service could be based on the usage of compute instances (105, 106, 107) that are utilized by the content publisher 110. For example, on-demand transcoding instances can let customers of the service provider pay for compute capacity by the hour that their transcoding instance runs. This can free the content publisher from the costs and complexities of planning, purchasing, and maintaining hardware and transforms what are commonly large fixed costs into much smaller variable costs.

As an alternative option, the content publishers can use reserved transcoding instances. When using reserved transcoding instances, content publishers make a one-time, up-front payment for each transcoding instance they wish to reserve for a long period of time (e.g. 1-3 year term). In return, the customer may be given a discount off the ongoing hourly usage rate for the transcoding instances.

As an alternative option, a set of spot instances could be utilized. In accordance with an embodiment, spot instances enable a content publisher to bid on and purchase unused capacity of the compute instances of other customers at a market place. In some embodiments, instances sold on the spot market may be reclaimed at any moment if they are needed for customers that have previously reserved the computing capacity. Spot instances may be especially useful for handling seasonal or project peak demand and large library re-encodes for new codecs. In some cases, the spot instances may be used for transcoding jobs that are not extremely urgent, because using those instances may incur the risk that other users may be using them and therefore none of the spot instances are available. In other cases, however, using spot instances may be an effective way to get extremely urgent work performed cheaply if there is a significant number of spot instances available. Taking advantage of low bid opportunities for instances, can enable a customer (e.g. content publisher) with pricing advantages they have not been offered without building out transcoding services on their own.

As an alternative option, pricing by gigabyte (or other unit) of transcoded content output may be employed by the transcoding service. In accordance with an embodiment, gigabyte (GB) usage could be calculated by adding the size of the input file and the combined size of the output files. For example, if a 1GB file were to be transcoded into two formats, each producing a 0.5 GB file, the total amount billed would be 2 GB.

As an alternative option, the transcoding service could charge by output video minutes (e.g. the cumulative minutes of the output transcoded media). Calculation of content length in minutes by the number of output formats could give customers an expectation of what they will be billed. The transcoding service could control the number of unique compute instances that would be launched to support a transcoding job, since licensing costs may be determined by the number of instances launched for a given user.

As mentioned above, the transcoding service can be configured to accept media content in a wide variety of incoming formats and can convert the content into a comprehensive collection of output encodings, including various media formats and bitrates. The media transcoding and processing service could include an API, user portal, or graphical user interface (GUI) that includes locations (stores) for a content publisher to upload media files. The input store may include any storage, bucket, container, directory, memory location, or any other place where media can be located. In some embodiments, the input store could have a unique profile associated therewith for transcoding the media file to produce an output of the media file in various predefined media formats. There could be an input location for commonly used profiles and for combinations of commonly used profiles. Alternatively, the workflows and profiles can be selected and applied based on various attributes of the media file (e.g. file name, metadata, etc.) rather than being associated with the input store itself.

In accordance with an embodiment, whenever content is placed in a location decided upon in advance by the content publisher and the service provider, the service provider could run a predetermined workflow. For example, the content publisher's needs could be to have a daily cable news program transcoded into formats for devices running Android® and Apple® IOS operating systems after the program airs each day, with advertisements and access controls applied to the media file. These needs can be expressed as a workflow conveyed to the service provider by way of an API or some other interface exposed to the content publisher. In one instance, the media input location could be on a server residing with the content publisher which the service provider has been granted access to. Therefore, each day, after the cable news program has aired, the service provider may automatically pull and transcode the file according to the workflow conveyed by the content publisher. In another instance, the decided upon location could be a server residing with the service provider to where the content publisher uploads or pushes the file each day after the news program airs.

Figure 2:
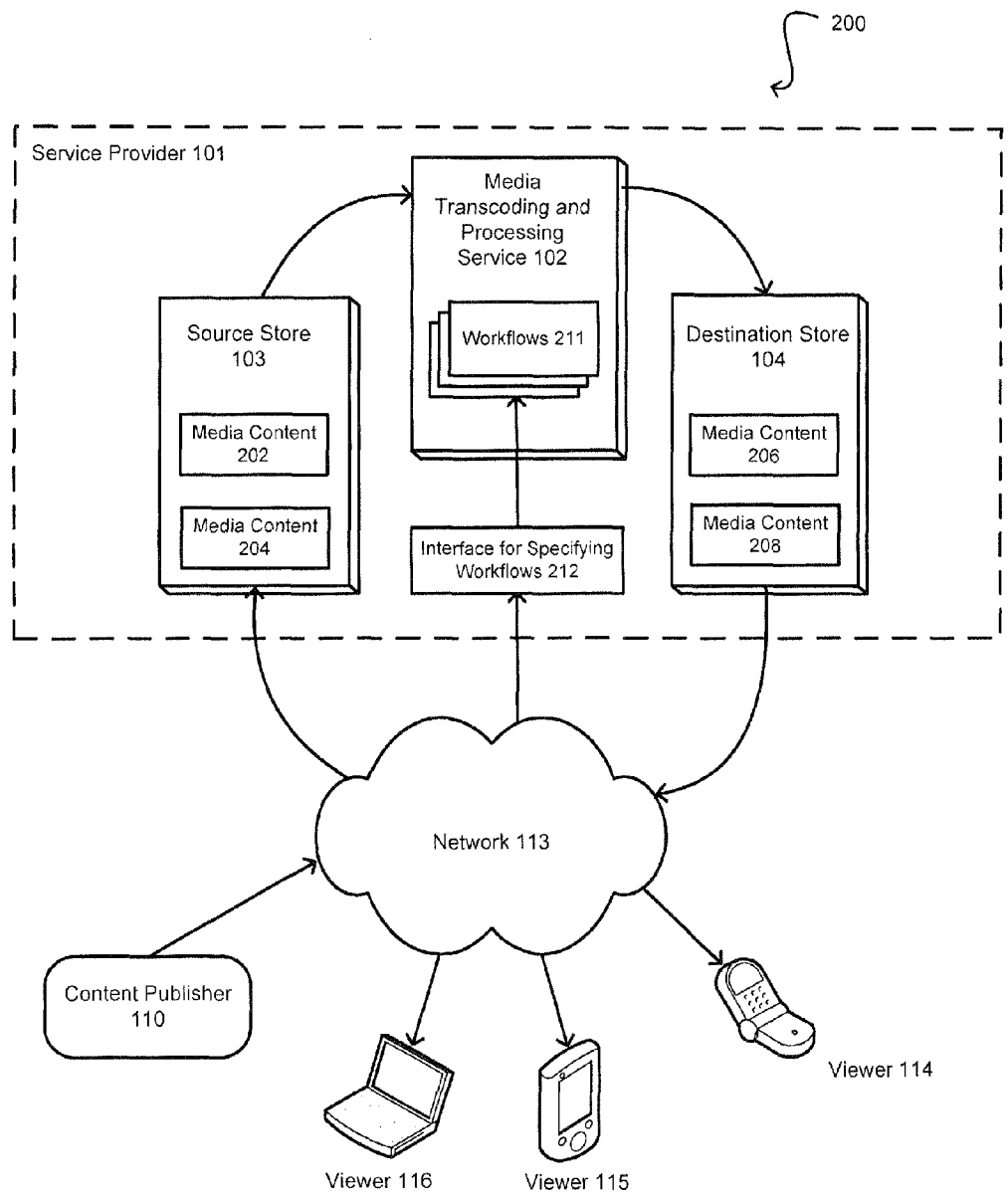
FIG. 2 illustrates an example of a component level diagram for transcoding or processing media content in accordance with one embodiment.

FIG. 2 illustrates an example of a component level diagram 200 for transcoding or processing media content in accordance with one embodiment. In this example, a content publisher 110 produces or creates media content (202, 204). In other examples, the entity providing the media files could be a content creator, distributor, user who has generated their own content, or any other entity with a need to transcode media files. Initially, the media content (202, 204) is typically in a default media format used by the content publisher 110 for a particular type of media. As described above, the content publisher 110 may have a need to transcode the media content (202, 204) into other media formats, such as media content (206, 208) to be compatible with a variety of devices, operating systems or applications.

To access the media transcoding service as described herein, the content publisher 110 can register with, or subscribe to the service through a network 113, such as the Internet. The service provider 101 may provide a source (i.e. input) store 103 and a destination (i.e. output) store 104. The source and destination stores could be located on a device in a single resource center or multiple resource centers, a storage bucket providing redundant data storage for storing and retrieving data through the Web, an elastic block store providing block level storage volumes, a web service providing resizable compute capacity, a cache server, a storage appliance, or any other input/output storage. In alternative embodiments, the source and destination stores can be residing in other locations, such as the content publisher's systems, third party servers or the like.

In the illustrated embodiment, after registering with the service, the content publisher 110 can provide media content (202, 204) to the input store, such as by uploading the media content for example. In one embodiment, the media transcoding service 102 can monitor, or periodically scan all of the input stores for new or modified media content that may be placed therein. When an upload is detected to input store 103, for example, the transcoding service 102 retrieves the uploaded media content (202, 204) and begins a workflow to apply a particular profile to transcode the media. In accordance with one embodiment, the particular workflow that is to be applied to the media may have been pre-specified by the content publisher using an interface 212 (e.g. API, console, etc.). For example, the content publisher 110 may have specified that for certain types of files placed into input store 103, a workflow should be applied to transcode the files into formats for mobile devices, and for certain other types of files placed into input store 103, a different workflow should be applied to insert advertisements and to apply access controls.

When a media file arrives in the input store, the transcoding service can inspect the file and automatically determine which of the workflows 211 should be applied to it based on the various attributes associated with the file. In one embodiment, the transcoding service may use a regular expression (regex) based on the file name, to select the workflow to apply. For example, if the file name were "H264_MP4_1234.wav", the transcoding service may parse the name and determine that this particular file should be transcoded into the H.264 format and MP4 format. In this manner, the content publisher may indicate which formats it wants the particular file transcoded into by simply naming them using a particular naming convention. In various alternative embodiments, the selection of the workflow may be performed based on various other factors, such as embedded metadata, file size, file type, time of day, the user that submitted the file, a separate file and the like.

Once the workflow has been carried out (including applying various profiles to the media), the transcoding service 102 may send the resulting media content (206, 208) to a specific location, such as destination store 104. In the illustrated example, the media content (206, 208) may then be made available one or more viewer devices (114, 115, 116) through the network 113. In alternative embodiments, the media content (206,208) which has had the workflow applied to it may be made available to various other entities, such as third party service providers, distributors or advertisers.

It should be noted that although the input store 103 is shown in FIG. 2 to be residing on the service provider, this is not intended to be limiting to all of the embodiments described herein. In alternative embodiments, the media content may be located in storage locations that geographically reside with the content publisher 110. In these embodiments, the content publisher 110 may place or provide the media content in a storage location that is run and operated by, and which geographically resides with, the content publisher. In this example, the transcoding service 102 could be notified of new content or modified content in the remote storage location located with the content publisher and automatically retrieve/pull the media content from that location. Alternatively, the transcoding service could have a predetermined schedule for retrieving the media content, such as after the airing of a television show, for example. Once the media content is retrieved, the transcoding and processing service 102 may automatically initiate the predetermined workflow and apply one or more profiles to produce the media content (206, 208). Once the workflow(s) has been applied, the service 102 may send the media content (206, 208) to destination store 104, for example, and the files may be made available to one or more viewer devices (114, 115, 116) or other entities through the network 113. In various embodiments, the destination store 104 could also be run and operated by, or geographically reside with the content publisher 110 or third party who hosts the transcoded media content (206, 208) to the one or more end user devices (114, 115, 116).

Following an example previously described, a cable television show that ends at 9:00 pm each Sunday could be scheduled to have a particular workflow applied each Sunday at 9:01 pm (or immediately following the end of the episode). After the show airs, the shows media file could be saved or uploaded to the input store 103 and the service provider can be provided access to the file and automatically apply one or more workflows thereto. The workflow could, for example, transcode the media file formatted for cable television into additional media formats for various Internet browsers, tablet computers, and smartphones. In addition, the predetermined workflow may include digital watermarking, inserting advertisements, adding meta data, transmuxing, transcribing, adding subtitles, and the like.

It is to be understood that the above examples described with respect to FIG. 2 are simplified examples used to describe two specific operation instances of a service in accordance with the present disclosure. For example, the service provider could have many source and destination stores like stores 103 and 104. In addition, stores 103, 104 could be located on the same physical storage server or could be distributed across multiple storage locations located in different geographic locations. In some embodiments, the content could be automatically pushed from the content publisher to the service provider or the content could be automatically pulled from the content publisher. In some embodiments, a particular input store may be associated with a single workflow. In that case, the service provider may determine which workflow(s), or actions to initiate by virtue of the media content being placed into the specific input store.

Figure 3:
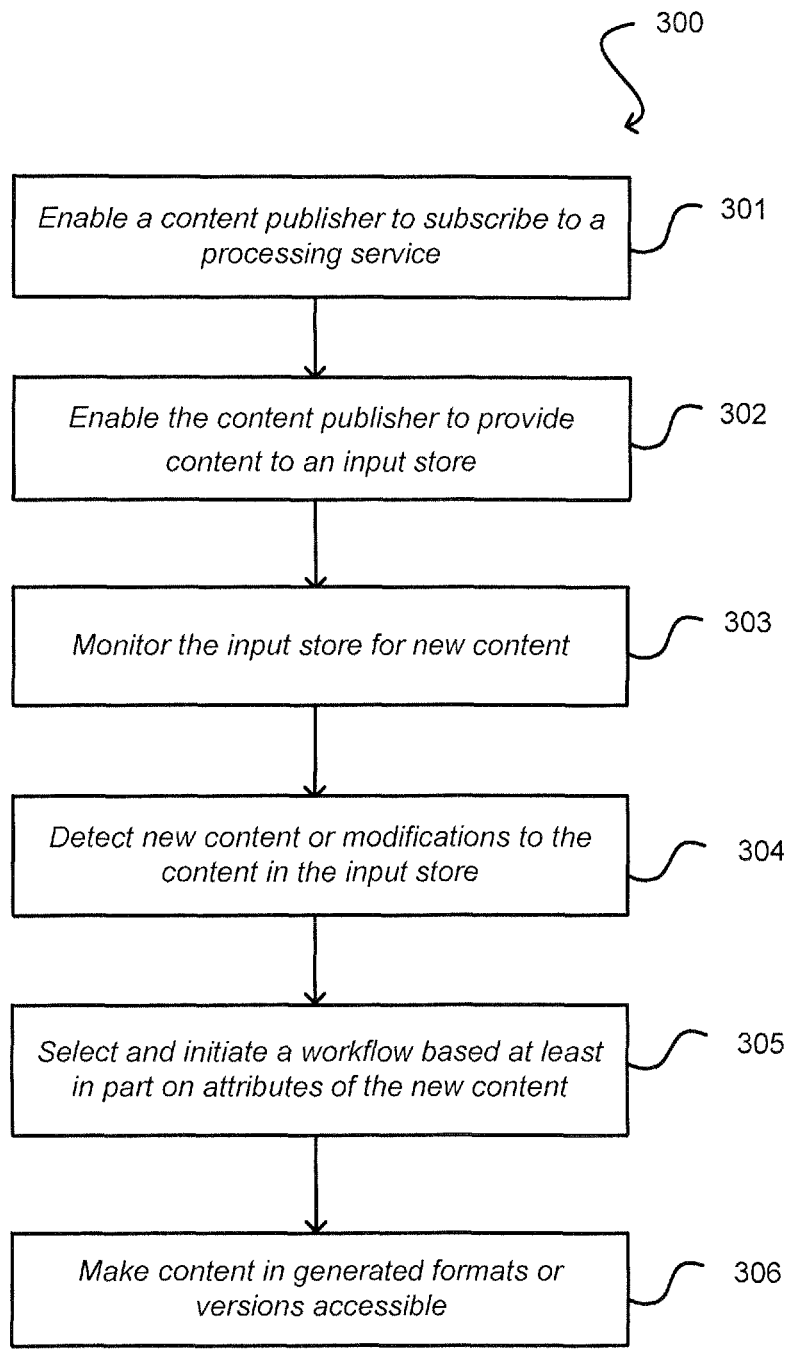
FIG. 3 illustrates an example process for transcoding or processing media content, in accordance with various embodiments.

FIG. 3 illustrates an example process 300 for processing media content in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 301, a service for processing content is made available to content publishers and/or other users. As discussed, this can include transcoding, transmuxing, or otherwise processing content such as media files. The service may provide an input store for storing various media file types. Alternatively, the service may be provided with access to a remote input store that is located at the geographic location of the content publisher. The content publisher may be allowed to register or subscribe to the service over a network, such as the Internet. Subscribing to the service may enable the content publisher to upload media files, have media files pulled from the content publisher's storage device, and to utilize transcoding and various other services.

In operation 302, the content publisher is enabled to provide content to an input store associated with the content processing service. For example, if the content publisher wants to generate one or more other formats and/or versions of the content, a subscribed user can upload the media file to an input store, for example, or schedule the service to automatically retrieve the content from the input store.

In operation 303, the processing service can monitor the input store for new content. For example, the processing service may periodically scan the input store for new content or modifications to existing content. The frequency of the scanning may be configurable by the content publisher or by the service provider.

In operation 304, the service may detect that new content has been placed into the input store. This may occur as a result of periodically scanning the input store. Alternatively, the processing service may receive a notification indicating that new content has been added to the input store.

In operation 305, the content processing service automatically selects a workflow to be applied to the content. In one embodiment, the service provider may inspect the content and based on the attributes of the file (e.g. file name, file type, metadata, etc.) automatically determine which workflow(s) to apply. In an alternative embodiment, the predetermined workflow is selected based on the input store to which the content is uploaded.

In operation 306, at least one instance of the content in the new format(s) and/or version(s) is then made accessible to one or more viewer devices, applications, or other such components. In addition, or in the alternative, the service may provide the processed content to any other entities, including the content publisher or third party service provider.

Figure 4:
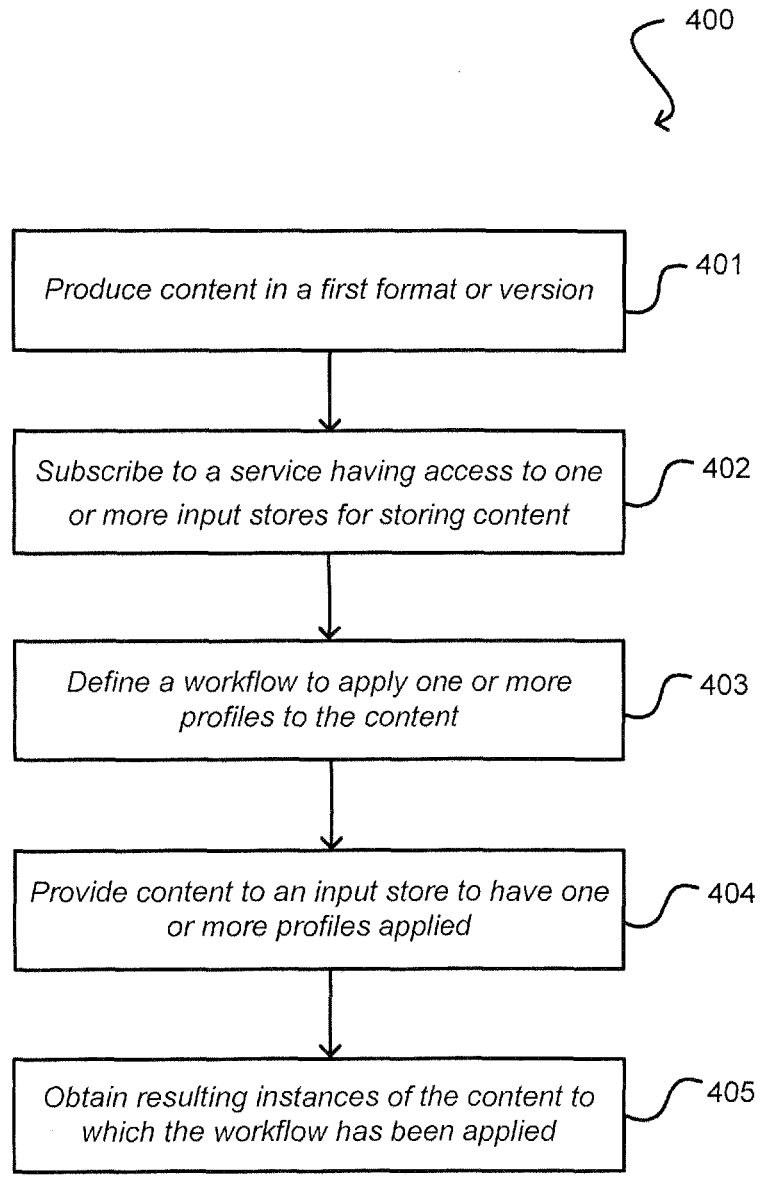
FIG. 4 illustrates an example process for transcoding media from a content publisher's perspective, in accordance with various embodiments.

FIG. 4 illustrates an example process 400 for processing content from a content publisher's perspective, in accordance with various embodiments.

In operation 401, a content publisher produces content, such as a media file, in a first format and/or version. The content can be in any incoming format, such as H.264 or MP4, for example. In operation 402, the content publisher subscribes to a service that may be provided by a service provider. In one embodiment, the service provider maintains a resource center that includes one or more input stores. In addition, the service provider may expose a set of interfaces that the content publisher may utilize to create a workflow for specific types of media. For example, by using the interface (operation 403), the content publisher may create a workflow that processes certain content files into one or more specified encoding formats and applies a watermark to each resulting file.

In operation 404, after subscribing to the service and creating one or more workflows, the content publisher may upload content to one of the input stores of the service provider. Alternatively, the content publisher may instruct the service provider to pull or retrieve content placed into a location by the content publisher. For example, the service provider may be instructed to retrieve content on a recurring weekly schedule from an input store on a server residing with the content publisher. Thereafter, when content is placed in the input store, the service provider automatically determines what the content publisher has specified, executes a predetermined workflow, and produces the desired output or product. Alternatively, the location could be a server residing with the service provider to which the content publisher uploads or pushes content.

In operation 405, the content publisher obtains one or more instances of the resulting content to which the specified workflow(s) has been applied, which can be in various formats and/or versions as discussed herein. In one embodiment, once the service has completed the workflow, the content is placed into the output (e.g. destination) store which was designated by the content publisher. For example, the content publisher may have specified the output store at the time of configuring the workflow using the interface of the service. In addition, the content publisher or the service provider may cause the content to be accessible the various viewer devices over the Internet, many of which may utilize formats that are different than the first format. Causing, in this context, refers to the content publisher either directly or indirectly making the content files available to end users. For example, the content publisher may cause the content to be available indirectly by instructing the service provider, or any other third party, to make the content available to the end users and host the content. Alternatively, the content publisher could receive back and host the content to end users directly through a system maintained and operated by the content publisher.

Figure 5:
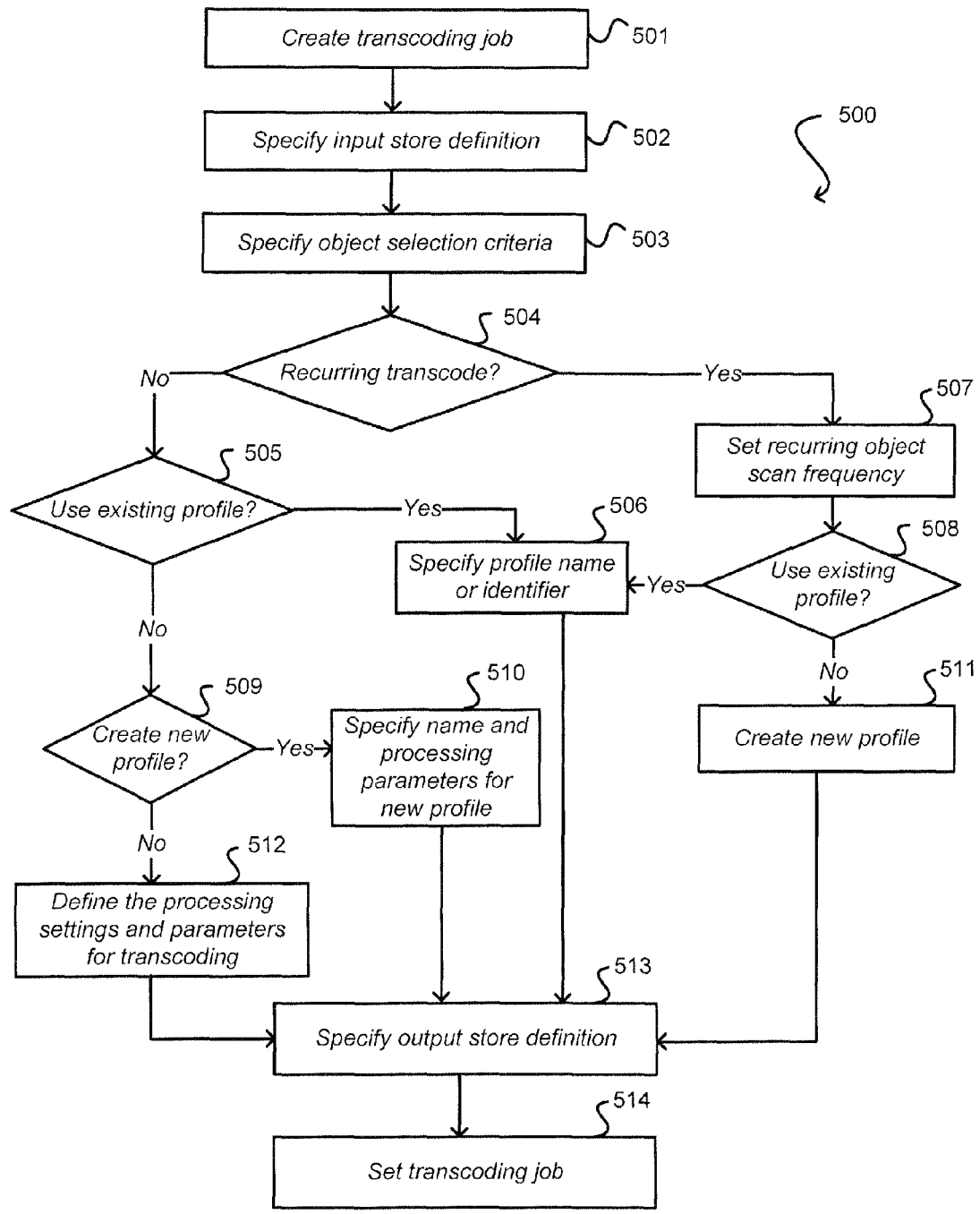
FIG. 5 is an example flow diagram of creating a transcoding job with the media transcoding service by a content publisher, in accordance with various embodiments.

FIG. 5 is an example flow diagram 500 of creating a transcoding job with the media transcoding service by a content publisher, in accordance with various embodiments.

In operation 501, a content publisher can create a workflow including a transcoding job that may be performed immediately or at a later time in the future. In operation 502, the content publisher may specify an input store definition for the transcoding job. For example, the content publisher may specify the location of the input store in which the media content that is to be transcoded will be placed. As previously described, the input store can be any specified storage location, including but not limited to a disk storage, memory, virtual store, database, or content management system. For example, the content publisher may specify a uniform resource locator (URL) of the storage location into which the media files will be uploaded. Additionally, in operation 503, the content publisher may define the object selection criteria for media objects that will be placed into the input store. In accordance with an embodiment, different types of media objects may be associated with different transcoding jobs. As such, the content publisher may specify which types of media content will be subject to this particular transcoding job. For example, a regular expression may be specified and if the filename of the incoming media file matches the regular expression, the transcoding can be applied to that file. Alternatively, the object selection criteria may be based on various other attributes, such as file size, file type, metadata, time, user that submitted the file, or other instructions. Yet in other embodiments, the transcoding may apply to all objects that are placed in the input store rather than specifying selection criteria.

In operation 504, it may be specified whether the transcoding process will be recurring, i.e. whether the transcoding will be automatically executed multiple times, for example, periodically or whenever new media content arrives in the input store. If the transcoding job is to be recurring, the content publisher may set the recurring scan frequency, as shown in operation 507. In one embodiment, the recurring scan frequency may indicate how often the transcoding service will scan the input store for new media content (e.g. once every minute, every day, etc.). If the transcoding will be recurring, the transcoding service may also need to utilize one or more profiles in order to supply the processing definition (e.g. processing settings and parameters) for the transcoding the media. For example, if the content publisher wishes to use an existing profile (operation 508), the content publisher may specify its name or other identifier (operation 506) and the existing profile will be loaded by the transcoding service. In one embodiment, the profile will provide all of the information, such as settings and parameters, which is necessary to transcode a media file into the encoding formats associated with the profile. If the content publisher does not wish to use an existing profile, they may create a new profile, as shown in operation 511. Creating a new profile may include specifying the necessary parameters and settings to transcode the media.

If the transcoding process will not be recurring, the content publisher may still select an existing profile to apply (operation 505) by specifying its name or identifier, as shown in operation 506. Electing to use an existing profile for a non-recurring transcoding job may relieve the user from the tedious task of having to specify all of the necessary settings and parameters to transcode the media into the desired formats. Similarly, the content publisher may decide to create a new profile (operation 509) to be used again in the future by specifying all of the processing parameters of the new profile (operation 510).

If the content publisher does not wish to create a new profile or use an existing profile, they may specify the processing parameters for the transcoding job (operation 512) which is being created, without the option of reusing those processing settings.

Once the profile(s) have been established or the settings have been specified, the content publisher may specify the output store, as shown in operation 513. The output store will be a location where the transcoded media content will be placed upon completion of the workflow. Similarly to an input store, the output store may be any storage location, such as disk storage, memory, virtual store, database, content management system or the like. The transcoding job may then be set for execution at a particular time or.

Figure 6:
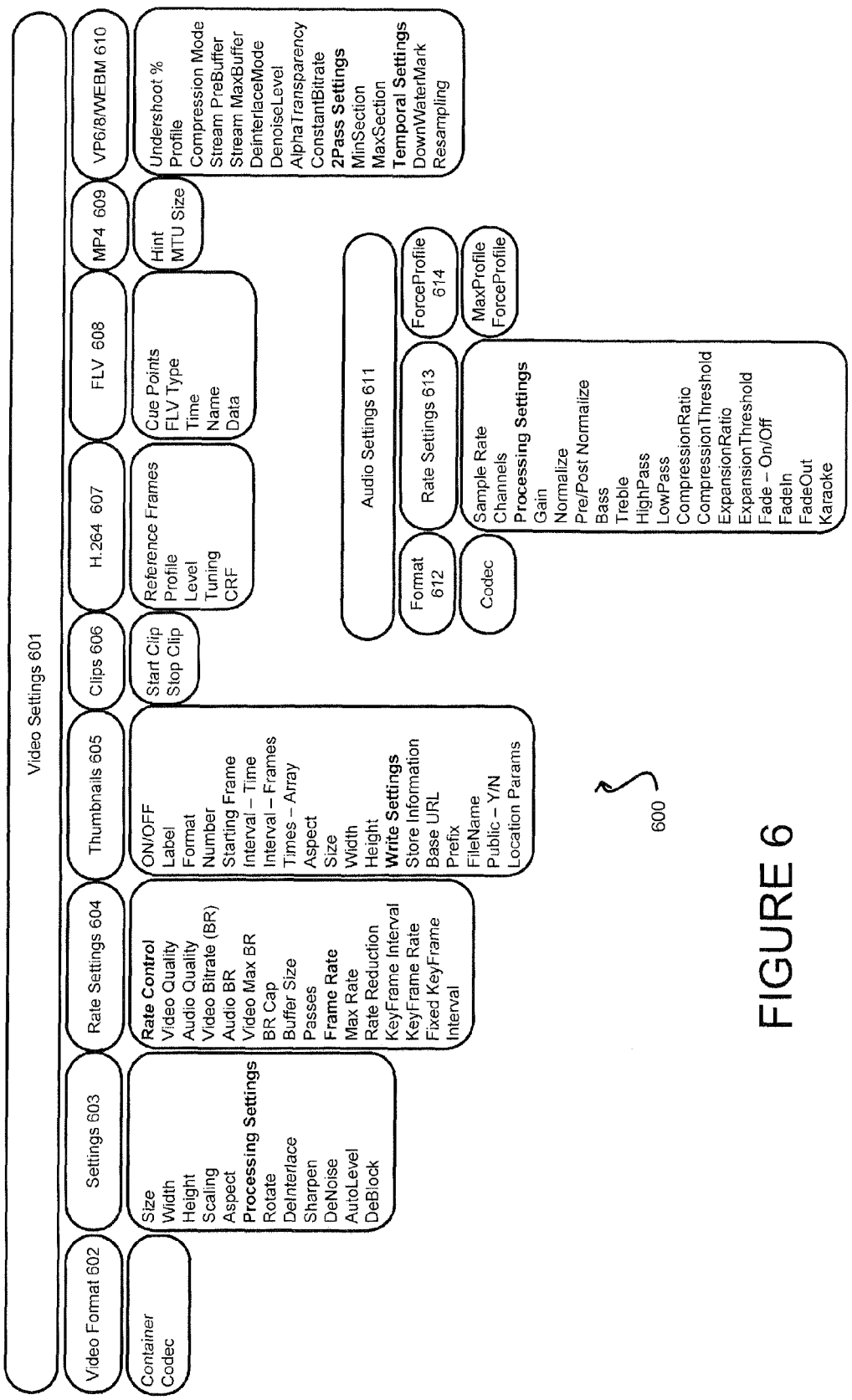
FIG. 6 illustrates one possible example of the various media settings that may be utilized by the media transcoding and processing service, in accordance with various embodiments.

FIG. 6 illustrates one possible example of the various media settings 600 that may be utilized by the media transcoding and processing service, in accordance with various embodiments.

As illustrated, the media settings may include video settings 601 and audio setting 611. The various video settings may include video format 602, settings 603, rate settings 604, thumbnails 605, clips 606, H.264 607, FLV 608, MP4 609 and VP6/8/WEBM 610. For example, settings 603 may include the size, width, height, scaling, aspect and processing settings of the video, while rate settings 604 may include video or audio quality, bitrates, buffer size, frame rate and the like.

Similarly, audio settings 611 may include the format 612, rate settings 613 and ForceProfile settings 614. For example, the audio rate settings 613 may include a sample rate, channels, gain, normalize, bass treble, high pass fade in/out and a variety of others. It should be noted, however, that the various video and audio settings illustrated in FIG. 6 are shown for illustration purposes only and are not intended to be limiting in any way to the embodiments presented in this disclosure.

Figure 7:
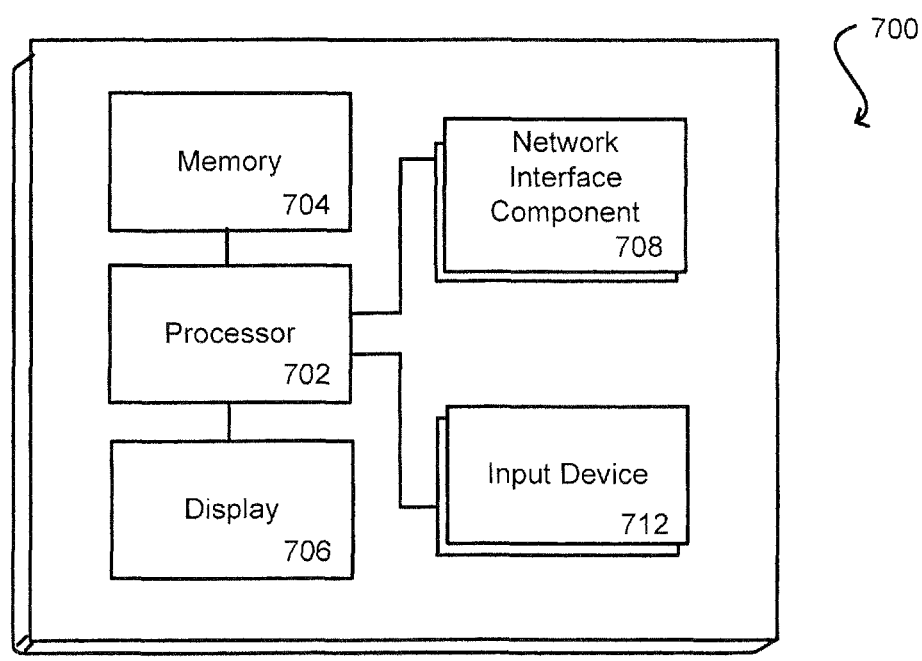
FIG. 7 illustrates a logical arrangement of a set of general components of an example computing device that could be utilized to perform the various transcoding and processing of media described throughout this specification.

FIG. 7 illustrates a logical arrangement of a set of general components of an example computing device 700 that could be utilized to perform the various transcoding and processing of media described throughout this specification. For example, the computing device 700 may be utilized to perform transcoding or other processing of the media files, as described throughout this disclosure. Alternatively, the computing device may be used to provide the input store for media content or perform any other function described herein. As illustrated in FIG. 7, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 712 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more network interface elements 708 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java*, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computer-implemented method, comprising:
enabling a content publisher to subscribe to a media transcoding service through a network, the media transcoding service having access to an input store and an output store, the media transcoding service being associated with a plurality of workflows for processing media content;
exposing, by the media transcoding service, an application programming interface (API) to the content publisher, the API enabling the content publisher to define a first additional workflow for processing a first type of media content and a second additional workflow for processing a second type of media content, each of the first and second additional workflow included in the plurality of workflows, the first additional workflow defining a first plurality of operations for processing the first type of media content and the second additional workflow defining a second plurality of operations for processing the second type of media content;
receiving, from the content publisher over a network, new media content to the input store, the new media content being in a first format;
monitoring the input store for the new media content sent over the network;
detecting that the new media content has been received into the input store;
inspecting one or more attributes associated with the new media content and selecting at least one of the first or second additional workflow of the plurality of workflows based at least in part on the one or more attributes, the at least one workflow being defined by the content publisher using the exposed API by the media transcoding service;

initiating the at least one workflow, the workflow including at least an operation of transcoding the new media content from the first format into a second format; and storing the transcoded new media content in the second format into the output store.

2. The method of claim 1, wherein the at least one workflow applies at least one of a plurality of settings or a plurality of parameters for transcoding the new media content from the first format into the second format.

3. The method of claim 1, wherein inspecting the one or more attributes and selecting the at least one workflow further includes:

parsing a filename associated with the new media content; and using a regular expression based on at least a portion of the file name to select the at least one workflow.

4. The method of claim 1, wherein the at least one workflow further includes at least one further operation of:

transmuxing the new media content, inserting a digital watermark to the new media content, applying access controls to the new media content, adding meta data to the new media content, inserting advertisements to the new media content, translating a language associated with the new media content, transcribing the new media content, changing bit rates associated with the new media content, sequencing, segmenting the new media content, adding subtitles to the new media content, adding one or more audio tracks to the new media content, or changing the one or more audio tracks of the new media content.

5. The method of claim 1, wherein selecting the at least one workflow further includes:

selecting the at least one workflow based on at least one of meta data associated with the new media content, file type associated with the new media content, file size associated with the new media content, time of day, a user that submitted the new media content or a configuration file.

6. The method of claim 1, wherein monitoring the input store for media content further includes:

scheduling the media transcoding and processing service to scan the input store at one or more specified times, the workflow being scheduled execute at the one or more specified times in order to process the new media content from the input store.

7. The method of claim 1, further comprising:

determining a usage of the media transcoding service associated with the at least one workflow; and determining a price associated with the usage of the media transcoding service using a pricing model.

8. The method of claim 7, wherein the usage is based on at least one of an amount of time during which the at least one workflow executes or an amount of data associated with the new media content and the transcoded media content.

9. A method comprising:

exposing an application programming interface (API) to at least one user, the API enabling the at least one user to define one or more additional workflows among a plurality of workflows for processing content to be provided by the least one user, the one or more additional workflows including a first additional workflow for processing a first type of content and a second additional workflow for processing a second type of content, first additional workflow defining a first plurality of operations for processing the first type of content and the second additional workflow defining a second plurality of operations for processing the second type of content;

enabling the at least one user to provide the content to an input store, the input store having been pre-specified;

determining that the content has been placed into the input store; and in response to determining that the content has been placed into the input store, automatically:

selecting at least one of the first or second additional workflow from the plurality of workflows for processing the content, the selecting being based at least in part on one or more attributes associated with the content, the at least one workflow being defined by the content publisher using the exposed API;

executing the workflow to generate at least one additional instance of the content, the at least one additional instance including at least one of a different format or a different version from the content; and providing access to the at least one additional instance of the content.

10. The method of claim 9, wherein the workflow applies at least one of a plurality of settings for transcoding the content from a first format into at least a second format.

11. The method of claim 9, wherein determining that the content has been placed into the input store further includes:

periodically scanning the input store for new content or modifications to the content; and detecting that the new content has been added to the input store or the modifications have been made to the content in the input store.

12. The method of claim 9, wherein determining that the content has been placed into the input store further includes:

receiving a notification indicating that the content has been placed into the input store.

13. The method of claim 9, wherein selecting a workflow from a plurality of workflows further includes:

parsing a filename associated with the content;

using a regular expression based on at least a portion of the filename to select the workflow from the plurality of workflows.

14. A method, comprising:

producing media content in a first format;

subscribing to a service through a network, the service including at least one input store capable of storing the media content;

accessing an application programming interface (API) provided by the service API enabling one or more additional workflows to be specified, including a first additional workflow for processing a first type of content and a second additional workflow for processing a second type of content, the first additional workflow defining a first plurality of operations for processing the first type of content and the second additional workflow defining a second plurality of operations for processing the second type of content;

providing the media content to the input store, the service configured to select and apply at least one of the first or second additional workflow to the media content based at least in part on one or more attributes associated with the media content, and wherein the plurality of operations in the first or second additional workflow include at least transcoding the media content into at least a second format and storing the media content in the second format into an output store based at least in part on the order for performing the plurality of operations; and accessing the media content in the second format from the output store.

15. The method of claim 14, wherein the service selects the first or second additional workflow based on at least one of:

a regular expression based on filename associated with the media content, meta data associated with the media content, file type associated with the media content, file size associated with the media content, time of day, a user that submitted the media content, or a configuration file.

16. A computing device, comprising:
a processor; and
a memory device including instructions that, when executed by the processor, cause the processor to:
exposing an application programming interface (API) to at least one user, the API enabling the at least one user to define one or more additional workflows among a plurality of workflows for processing content to be provided by the user, the one or more additional workflows including a first additional workflow for processing a first type of content and a second additional workflow for processing a second type of content, the first additional workflow defining a first plurality of operations for processing the first type of content and the second additional workflow defining a second plurality of operations for processing the second type of content;
enable a user to provide the content to an input store, the content being provided in a first format;
determine that the content has been placed into the input store;
select, using a policy, at least one of the first or second additional workflow from the plurality of workflows for processing the content, the workflow being defined by the at least one user using the API;
execute the at least one workflow, the plurality of operations in the at least one workflow at least transcoding the content that has been placed in the input store to produce a version of the content in a second format; and
storing the version of the content in the second format into a specified output store for access by one or more client devices that employ the second format.

17. The computing device of claim 16, wherein the workflow applies at least one of a plurality of settings for transcoding the content from a first encoding format into at least a second encoding format.

18. The computing device of claim 16, wherein
determining that the content has been placed into the input store further includes: periodically scanning the input store for new content or modifications to the content; and
detecting that the new content has been added to the input store or the modifications have been made to the content in the input store.

19. The computing device of claim 16, wherein determining that the content has been placed into the input store further includes:
receiving a notification indicating that the content has been placed into the input store.

20. The computing device of claim 16, wherein
selecting, using a policy, a workflow from a plurality of workflows further includes:
parsing a file name associated with the content; and
using a regular expression based on at least a portion of the file name to select the workflow from the plurality of workflows.

21. A non-transitory computer readable storage medium storing one or more sequences of instructions executable by one or more processors to perform a set of operations, comprising:
exposing an application programming interface (API) to at least one user, the API enabling the at least one user to define one or more additional workflows among a plurality of workflows for processing content to be provided by the at least one user, the one or more additional workflows including a first additional workflow for processing a first type of content and a second additional workflow for processing a second type of content, the first additional workflow defining a first plurality of operations for processing the first type of content and the second additional workflow defining a second plurality of operations for processing the second type of content;
receiving the content to an input store, the content being provided in a first version;
receiving a notification that the content has been placed into the input store;
automatically selecting one of the first or second additional workflow from the plurality of workflows for processing the content, the workflow being selected based at least in part on a set of attributes associated with at least one of the content or the input store, the workflow being defined by the at least one user using the API;
executing the workflow, the workflow including one or more operations for generating a new version of the content; and
causing the new version of the content to be made available for access to one or more viewer devices.

22. The non-transitory computer readable storage medium of claim 21, wherein the workflow applies at least one of a plurality of settings for transcoding the content from a first encoding format into at least a second encoding format.

23. The non-transitory computer readable storage medium of claim 21, wherein selecting a workflow from a plurality of workflows further includes:
parsing a file name associated with the content; and
using a regular expression based on at least a portion of the file name to select the workflow from the plurality of workflows.

24. The non-transitory computer readable storage medium of claim 21, wherein the workflow further includes at least one of:
transmuxing the content, inserting a digital watermark to the content, applying access controls to the content, adding meta data to the content, inserting advertisements to the content, translating a language associated with the content, transcribing the content, changing bit rates associated with the content, sequencing, segmenting the content, adding subtitles to the content, adding one or more audio tracks to the content, or changing the one or more audio tracks of the content.

* * * * *